(12) United States Patent
Hempelmann et al.

(10) Patent No.: US 12,001,292 B2
(45) Date of Patent: Jun. 4, 2024

(54) BACKUP HOUSEKEEPING OPERATIONS BETWEEN DATABASE MANAGEMENT SYSTEMS AND EXTERNAL STORAGE

(71) Applicant: SAP SE, Walldorf (DE)

(72) Inventors: Henrik Hempelmann, Havelberg (DE); Anne Roessiger, Berlin (IN); Benedikt Klus, Hamburg (DE); Martin Brunzema, Berlin (DE); Stefan Voss, Potsdam (DE)

(73) Assignee: SAP SE, Walldorf (DE)

( * ) Notice: Subject to any disclaimer, the term of this patent is extended or adjusted under 35 U.S.C. 154(b) by 273 days.

(21) Appl. No.: 16/829,463

(22) Filed: Mar. 25, 2020

(65) Prior Publication Data

US 2021/0303412 A1  Sep. 30, 2021

(51) Int. Cl.
*G06F 11/14* (2006.01)
*G06F 16/11* (2019.01)
*G06F 16/17* (2019.01)

(52) U.S. Cl.
CPC ...... *G06F 11/1464* (2013.01); *G06F 11/1451* (2013.01); *G06F 11/1461* (2013.01); *G06F 11/1469* (2013.01); *G06F 16/122* (2019.01); *G06F 16/1734* (2019.01)

(58) Field of Classification Search
CPC ............. G06F 11/1464; G06F 11/1451; G06F 11/1461; G06F 11/1469; G06F 16/122; G06F 16/1734; G06F 2201/80
USPC ........................................................ 711/162
See application file for complete search history.

(56) References Cited

U.S. PATENT DOCUMENTS

| 11,137,931 | B1* | 10/2021 | Tsaur | G06F 11/1469 |
| 2007/0136381 | A1* | 6/2007 | Cannon | G06F 11/1451 |
| 2012/0089572 | A1* | 4/2012 | Raichstein | G06F 11/1461 |
| | | | | 707/645 |
| 2016/0092496 | A1* | 3/2016 | Dietterich | G06F 12/0276 |
| | | | | 707/692 |
| 2020/0089659 | A1* | 3/2020 | Attarde | G06F 16/1748 |
| 2020/0379976 | A1* | 12/2020 | Finkelstein | G06F 7/14 |

(Continued)

*Primary Examiner* — Gautam Sain
*Assistant Examiner* — Wei Ma
(74) *Attorney, Agent, or Firm* — Buckley, Maschoff & Talwalkar LLC (57) ABSTRACT

A system to manage database management system backup objects may include an external storage component storing a first database management system backup object. A database management system node (e.g., associated with a database as a service cluster of a hyper-scalar infrastructure) may be configured to write information to and read information from the external storage component without being able to delete information in the external storage component. A backup housekeeping component, independent of the database management system node, may trigger a request to retrieve backup requirement information (e.g., associated with a maximum backup age, a latest backup identifier, an indication of a newest backup to be deleted, etc.) from the database management system node. The backup housekeeping component may then delete all database management system backup objects in the external storage component that are no longer required, including the first database management object, based on the retrieved backup requirement information.

19 Claims, 10 Drawing Sheets

(56) References Cited

U.S. PATENT DOCUMENTS

2021/0194911 A1* 6/2021 Hecht ................. H04L 63/1433
2021/0232479 A1* 7/2021 Sprague .................. G06N 5/04

* cited by examiner

PRIOR ART

BACKUP HOUSEKEEPING OPERATIONS BETWEEN DATABASE MANAGEMENT SYSTEMS AND EXTERNAL STORAGE

BACKGROUND

An enterprise may use a Database Management System ("DBMS") to handle a substantial number of database transactions. This may be the case, for example, when a database management system is used by software companies, financial services businesses, e-commerce websites, Human Resource ("HR") departments, etc. Moreover, a DBMS such as a Relational DBMS ("DBMS") and/or Database as a Service ("DBaaS") may periodically store backup information. In this way, if something goes wrong with the database information can be restored or recovered to a prior known state. Typically, a RDBMS will manage such backups on its own. For example, the RDBMS may be able to perform backups to an external storage (and to restore backups from that storage when a recovery is required). For maintenance reasons, the RDBMS is also allowed to delete backups that are no longer required for recovery. (e.g., when there is an expiration policy at a certain maximum age, such as fourteen days).

There are disadvantages, however, to this typical approach. For example, if a cyber-attacker is able to execute arbitrary code with database permissions, he or she will be able to delete backups that are required to fulfil a Service-Level Agreement ("SLA") for a high availability database. In a worst-case scenario, this might even include the deletion of all backups (including those of other customers in the same storage environment). Due to the complexity of modern database systems, the risk of getting system access through the database itself is much higher as compared to other components of a hyper-scaler infrastructure. It may therefore be desirable to manage database management system backup objects in a secure, automatic, and accurate manner.

SUMMARY

According to some embodiments, a system to manage database management system backup objects may include an external storage component storing at least a first database management system backup object. A database management system node (e.g., associated with a database as a service cluster of a hyper-scalar infrastructure) may be configured to write information to and read information from the external storage component without being able to delete information in the external storage component. A backup housekeeping component, independent of the database management system node, may trigger a request to retrieve backup requirement information (e.g., associated with a maximum backup age, a latest backup identifier, an indication of a newest backup to be deleted, etc.) from the database management system node. The backup housekeeping component may then delete all database management system backup objects in the external storage component that are no longer required, including the first database management object, based on the retrieved backup requirement information.

Some embodiments comprise: means for writing information to, and reading information from, by a database management system node, an external storage component storing at least a first database management system backup object, wherein the database management system node is not able to delete information in the external storage component; means for triggering, by a computer processor of a backup housekeeping component independent of the database management system node, a request to retrieve backup requirement information from the database management system node; and means for deleting, by the computer processor of the backup housekeeping component, all database management system backup objects in the external storage component that are no longer required, including the first database management object, based on the retrieved backup requirement information.

Some technical advantages of some embodiments disclosed herein are improved systems and methods to manage database management system backup objects in a secure, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Provided herein are system, method and/or computer program product embodiments, and/or combinations and sub-combinations thereof, to manage database management system backup objects in a secure, automatic, and accurate manner.

Figure 1:
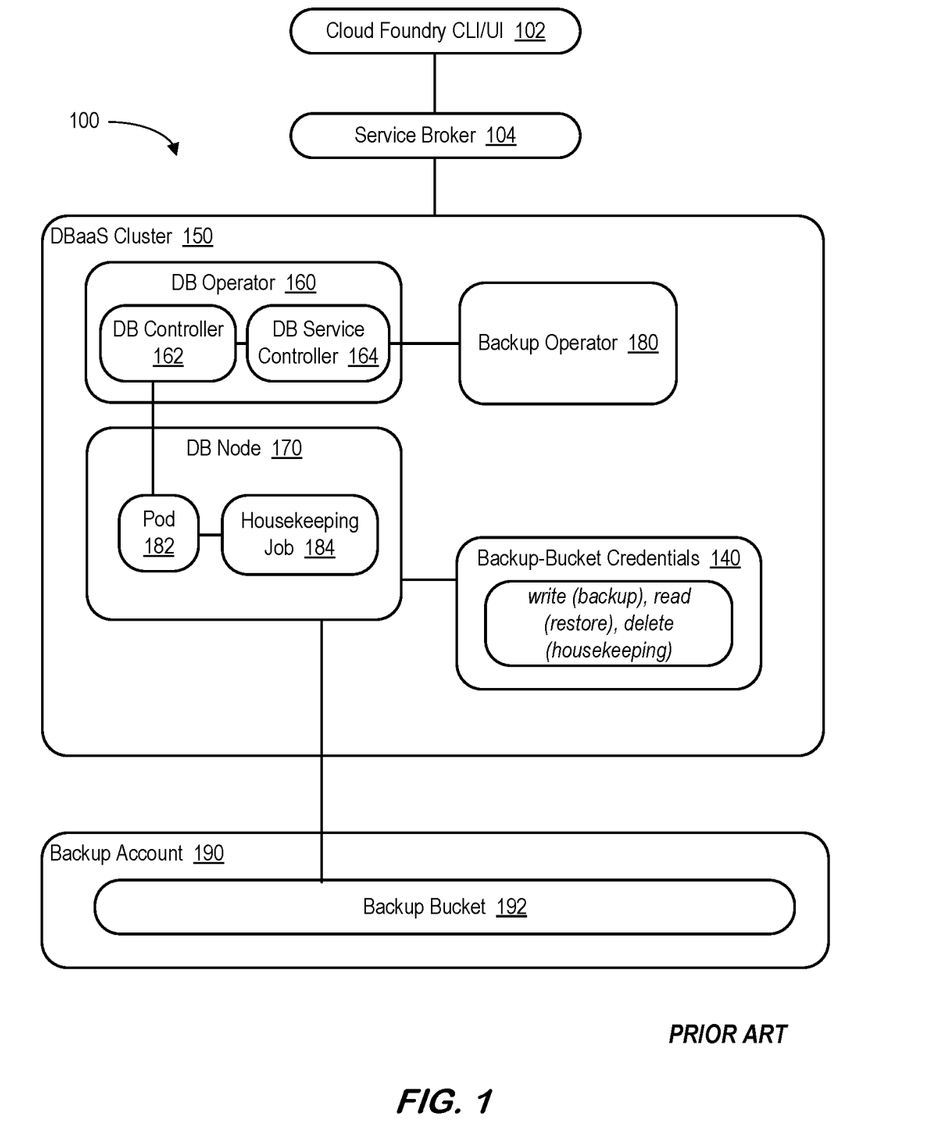
FIG. 1 is a block diagram of a typical system associated with a Database as a Service ("DBaaS").

FIG. 1 is a block diagram of a typical system 100 associated with a DBaaS that may be accessed via a Command Line Interface ("CLI") and/or User Interface ("UI") 102 (e.g., associated with CLOUD FOUNDRY® or a similar service) via a service broker 104. In particular, the system includes a DBaaS cluster 150 with a database operator 160 containing a database controller 162 and database service controller 164 (e.g., associated with appropriate resources). As will be described, the database service controller 164 may interact with a backup operator 180 to perform routine database backup operations (e.g., on an hourly basis, on a daily basis, after a predetermined number of database transactions have been executed, etc.). The database controller 162 may communicate with a database pod 182 in a database node 170 of the cluster 150. A housekeeping job 184 of the database node 184 manages backup objects in a backup bucket 192 of a backup account 190 (e.g., external storage). In particular, the database node 170 accesses backup-bucket credentials 140 associated with writes (backups), reads (restores), and deletes (e.g., housekeeping) and updates the backup bucket 192 as appropriate.

Figure 2:
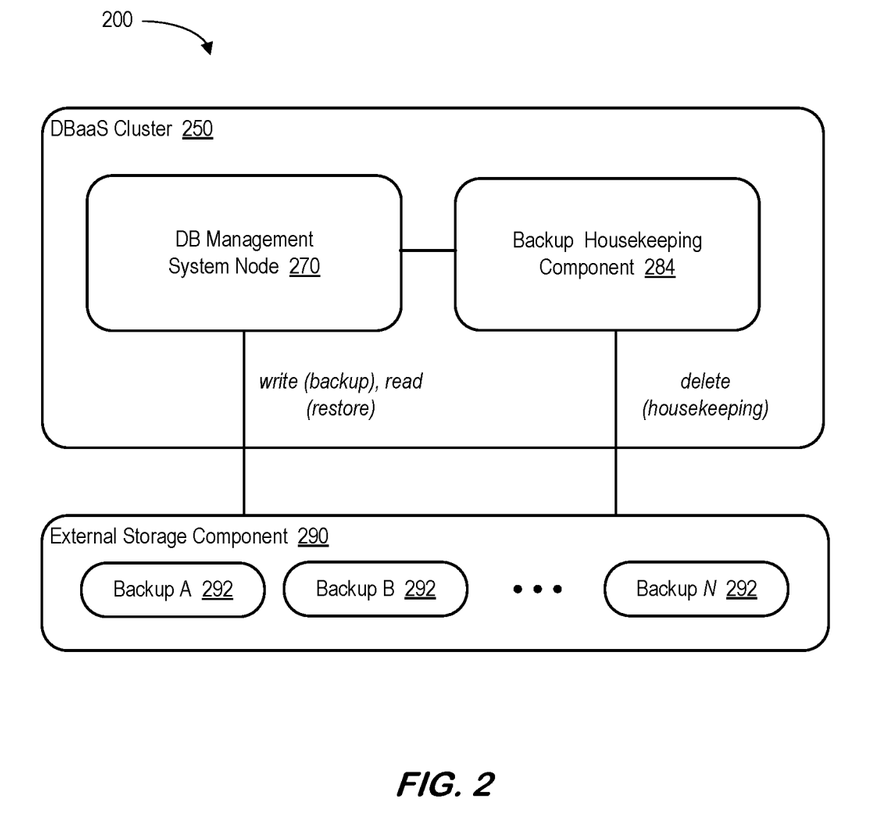
FIG. 2 is a high-level block diagram of a system architecture associated with a DBaaS in accordance with some embodiments.

There are disadvantages, however, to this approach. For example, if a cyber-attacker is able to execute arbitrary code with database permissions, he or she may be able to delete backups that are required to fulfil a SLA for a high availability database. In a worst-case scenario, this might even include the deletion of all backups in the backup account 190 (including those of other customers in the same storage environment). Due to the complexity of modern database systems, the risk of getting system access through the database itself is much higher as compared to other components of a hyper-scaler infrastructure. It may therefore be desirable to manage database management system backup objects in a secure, automatic, and accurate manner. In particular, a solution may execute backup housekeeping without giving the database "delete" access to backups in external storage. FIG. 2 is a high-level block diagram of a system 200 architecture associated with a DBaaS in accordance with some embodiments. The system 200 includes an external storage component 290 storing at least a first database management system backup object (e.g., backup A 292, backup B 292, through backup N 292).

A database management system node 270 in a database cluster 250 is configured to write information to (backup) and read information from (restore) the external storage component 290. According to this embodiment, however, the database management system node 270 is not able to delete information (e.g., perform housekeeping operations) in the external storage component 290. Instead, a backup housekeeping component 284 is independent of the database management system node 270. The backup housekeeping component 284 is able to trigger a request to retrieve backup requirement information from the database management system node 270. The backup housekeeping component 284 may then delete all database management system backup objects 292 in the external storage component 290 that are no longer required, including the first database management object, based on the retrieved backup requirement information.

Figure 3:
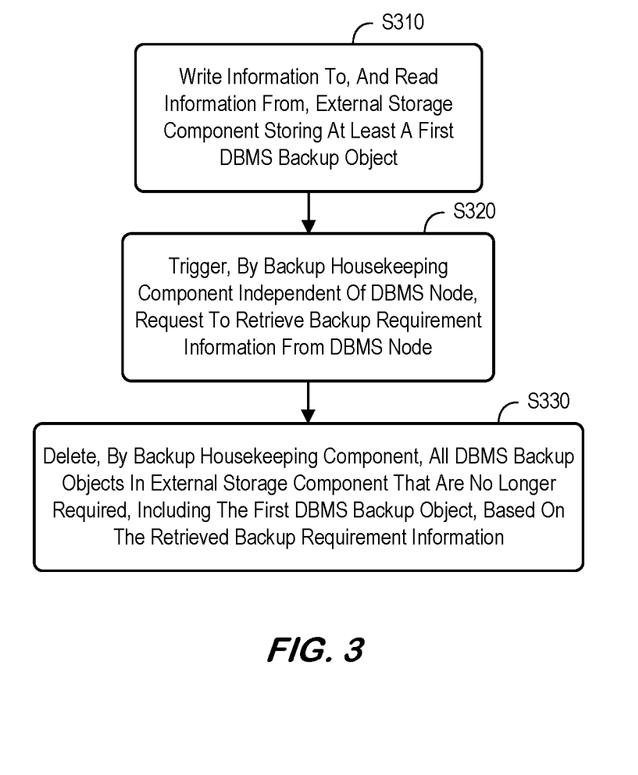
FIG. 3 is a database backup housekeeping method according to some embodiments.

FIG. 3 is a method that might performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S310, a database management system node may write information to, and read information from, an "external" storage component (external to the node) storing at least a first database management system backup object. According to some embodiments, the database management system node is not able to delete information in the external storage component. According to some embodiments, the database management system node is associated with a DBaaS cluster of a hyper-scaler infrastructure.

At S320, a computer processor of a backup housekeeping component, "independent" of the database management system node, may trigger a request to retrieve backup requirement information from the database management system node. As used herein, the term independent may refer to a component that cannot be accessed or compromised even when a cyber-threat is present in the database management system node. The backup requirement information might be associated with, for example, a maximum backup age (e.g., five days), a latest backup identifier (e.g., delete all objects older than the latest object), an indication of a newest backup to be deleted, etc.

At S330, the computer processor of the backup housekeeping component may delete all database management system backup objects in the external storage component that are no longer required, including the first database management object, based on the retrieved backup requirement information. According to some embodiments, the backup housekeeping component is not able to write information to or read information from the external storage component. Moreover, the backup housekeeping component might be implemented as part of a storage system associated with the external storage component. In some embodiments, the backup housekeeping component is further configured to transmit, to the database management system node, a confirmation that the first database management system backup object has been deleted (as well as any other backup objects that were deleted). In this case, the database management system node may update a database backup catalog in response to the confirmation received from the backup housekeeping component. According to some embodiments, a backup housekeeping strategy of the backup housekeeping component may be updated (and the single update could impact multiple customers or applications).

Figure 4:
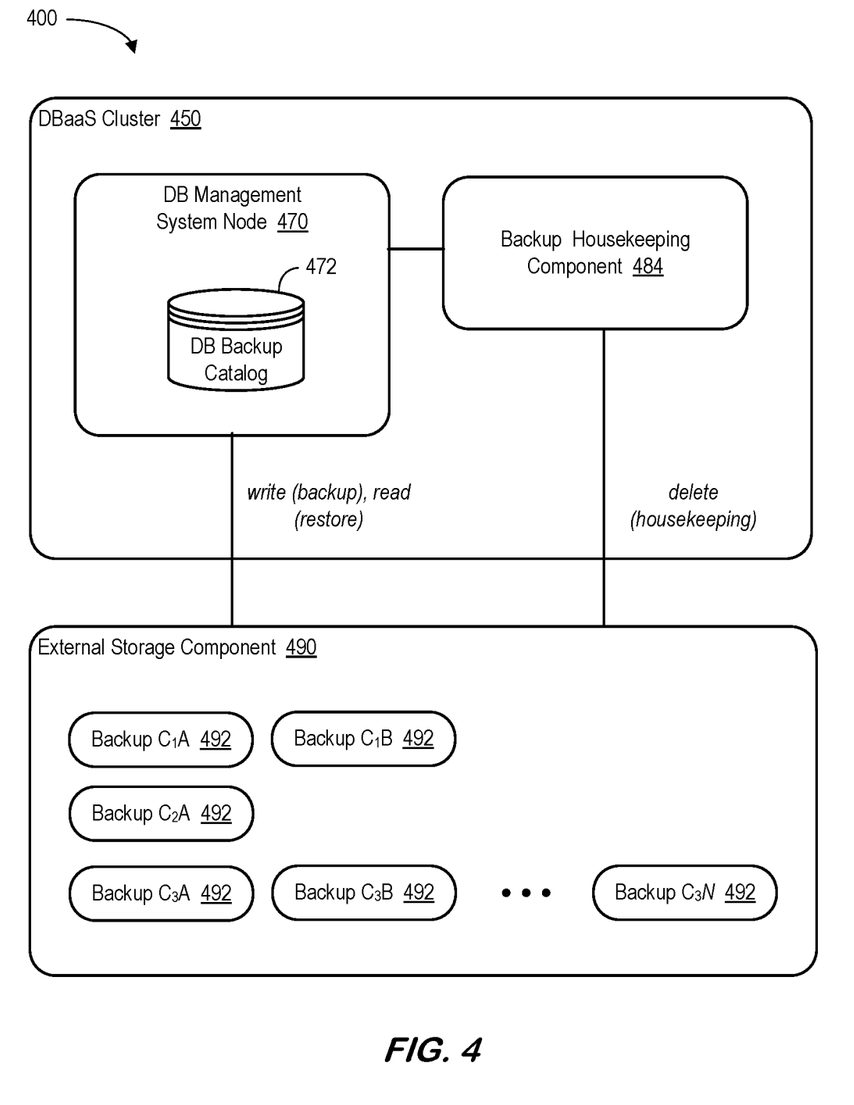
FIG. 4 illustrates a system for multiple customers in accordance with some embodiments.

Note that the external storage component may store a plurality of database management system backup objects for a customer (e.g., backups A through N 292 in FIG. 2). Moreover, in some embodiments, an external storage component may store a plurality of database management system backup objects for a plurality of customers. For example, FIG. 4 illustrates a system 400 for multiple customers ($C_1$ through $C_3$) in accordance with some embodiments. As before, the system 400 includes an external storage component 490 storing at least a first database management system backup object (e.g., backup $C_1A$ 492 and backup $C_1B$ 492 for customer $C_1$).

A database management system node 470 in a database cluster 450 with a backup catalog 472 is configured to write information to (backup) and read information from (restore) the external storage component 490 for all three customers ($C_1$ through $C_3$). According to some embodiments, each customer may have its own RDBMs and DB backup catalog 472. In some embodiments, multiple customers may share a common computing node. The database management system node 470 might, according to some embodiments, not be able to delete information (e.g., perform housekeeping operations) in the external storage component 490. Instead, a backup housekeeping component 484 is independent of the database management system node 470. The backup housekeeping component 484 is able to trigger a request to retrieve backup requirement information from the database management system node 470. The backup housekeeping component 484 may then delete all database management system backup objects 492 (for a client $C_1$ through $C_3$ as appropriate) in the external storage component 490 that are no longer required, including the first database management object, based on the retrieved backup requirement information.

Figure 5:
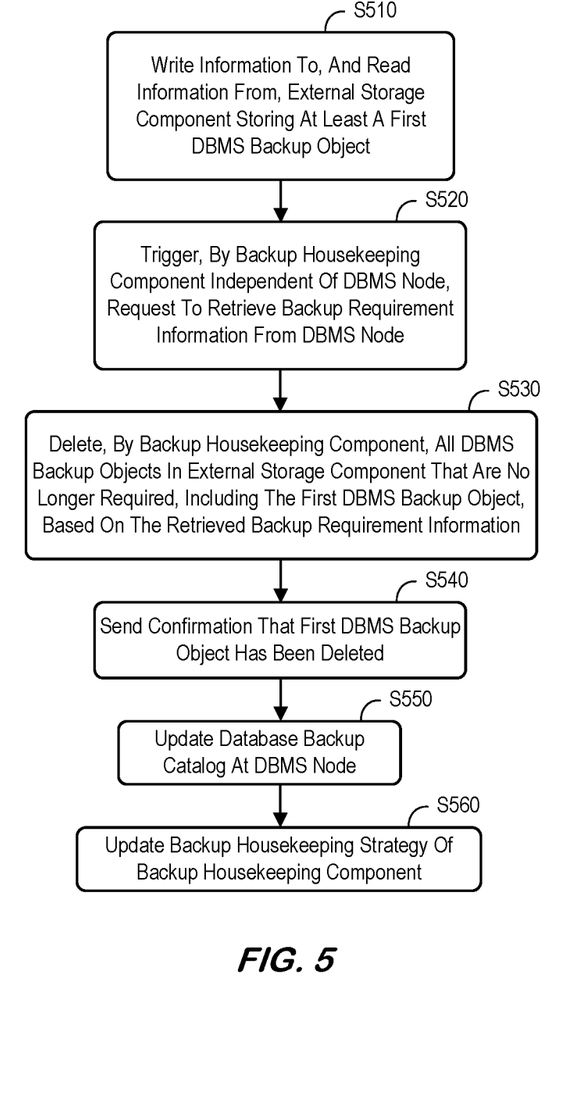
FIG. 5 is a more detailed database backup housekeeping method according to some embodiments.

FIG. 5 is a more detailed database backup housekeeping method 500 according to some embodiments. At S510, a database management system node may write information to, and read information from, an external storage component (external to the node) storing at least a first database management system backup object. According to some embodiments, the database management system node is not able to delete information in the external storage component. At S520, a computer processor of a backup housekeeping component, independent of the database management system node, may trigger a request to retrieve backup requirement information from the database management system node. At S530, the computer processor of the backup housekeeping component may delete all database management system backup objects in the external storage component that are no longer required, including the first database management object, based on the retrieved backup requirement information.

At S540, the backup housekeeping component may transmit, to the database management system node, a confirmation that the first database management system backup object has been deleted (as well as any other backup objects that were deleted). In this case, the database management system node may update a database backup catalog at S550 in response to the confirmation received from the backup housekeeping component. Moreover, at S560 a backup housekeeping strategy of the backup housekeeping component may be updated (and the single update could impact multiple customers or applications).

Figure 6:
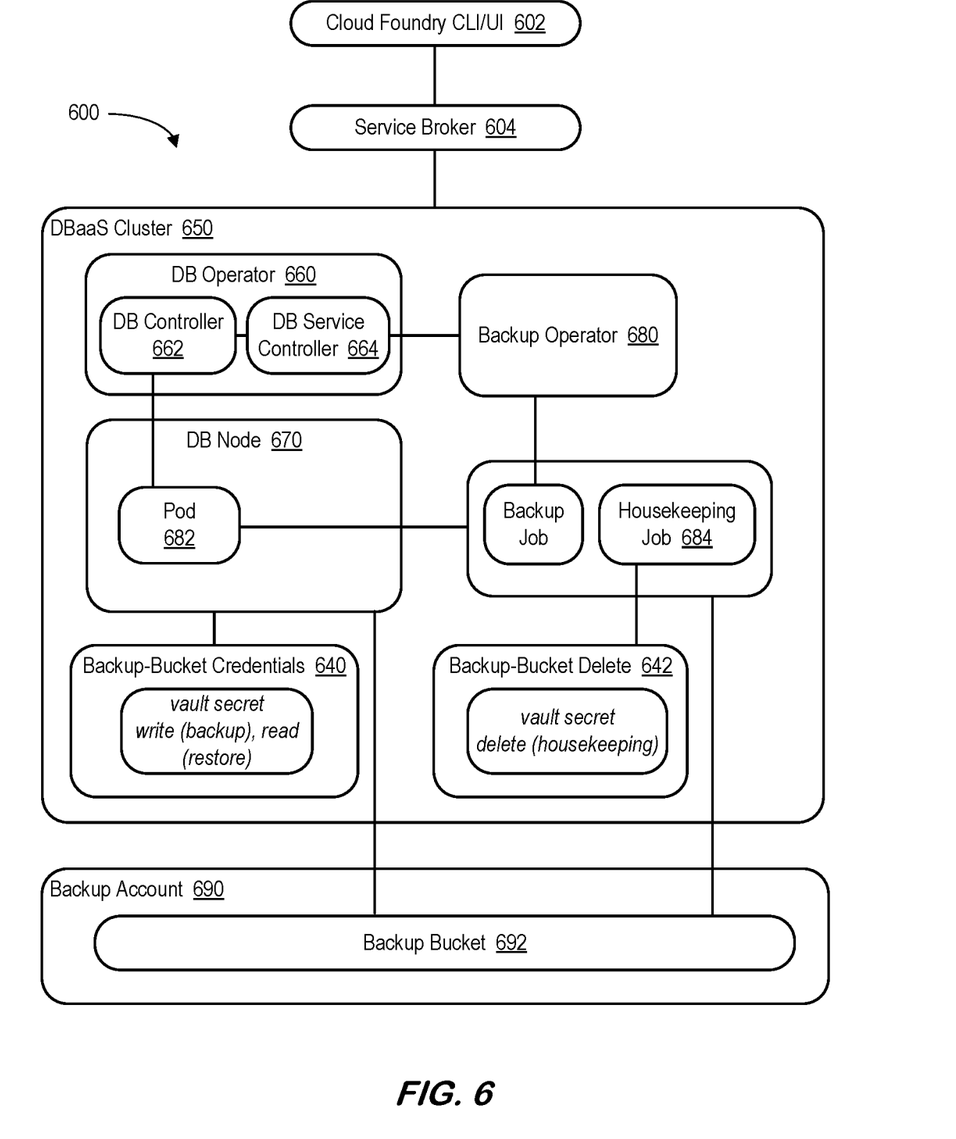
FIG. 6 is a more detailed database backup housekeeping system for implementing various embodiments.

FIG. 6 is a more detailed database backup housekeeping system 600 for implementing various embodiments. The system 600 may be associated with a DBaaS that is accessed via a CLI and/or UI 602 (e.g., associated with CLOUD FOUNDRY® or a similar service) via a service broker 604. In particular, the system includes a DBaaS cluster 650 with a database operator 660 containing a database controller 662 and database service controller 664 (e.g., associated with appropriate resources). As will be described, the database service controller 664 may interact with a backup operator 680 to perform routine database backup operations (e.g., on an hourly basis, on a daily basis, after a predetermined number of database transactions have been executed, etc.). The database controller 662 may communicate with a database pod 682 in a database node 670 of the cluster 650. A backup job and housekeeping job 684 independent from the database node 684 manages backup objects in a backup bucket 692 of a backup account 690 (e.g., external storage). In particular, the database node 670 accesses backup-bucket credentials 640 associated with writes (backups) and reads (restores) and updates the backup bucket 692 as appropriate. The housekeeping job 684 accesses backup-bucket delete credentials 642 associated with deletes (e.g., housekeeping) and updates the backup bucket 692 as appropriate.

Thus, a separate "housekeeping" component may run outside the scope of the database hyper-scaler infrastructure (e.g., directly as part of the storage system). The access rights of the housekeeping component are limited to the deletion of backups. Creation of new backups or manipulation of existing backups is not required for this operation (and thus are prohibited). Deletion is disabled for the RDBMS by access policies of the storage system. Instead, the deletion is outsourced to the new housekeeping component.

Due to the complexity of the matter, it may not possible for the housekeeping component to determine autonomously which backups are no longer required (and thus can safely be removed from external storage). To satisfy this requirement, the housekeeping component may access to the RDBMS to retrieve this information. The information might be returned, for example, in terms of the latest backup identifier to keep on the external storage, the newest backup to be deleted, etc.

After the backups are actually permanently deleted, the RDBMS may be notified which backups are no longer available (and thus can be removed from an internal data structure such as a database backup catalog). According to some embodiments, communication between the housekeeping component and the exiting RDBMS may always be triggered by the external housekeeping component, and no communication/action can be triggered by the RDBMS. As a result, a compact and clearly assigned implementation of the housekeeping component is provided with just this single responsibility.

Figure 7:
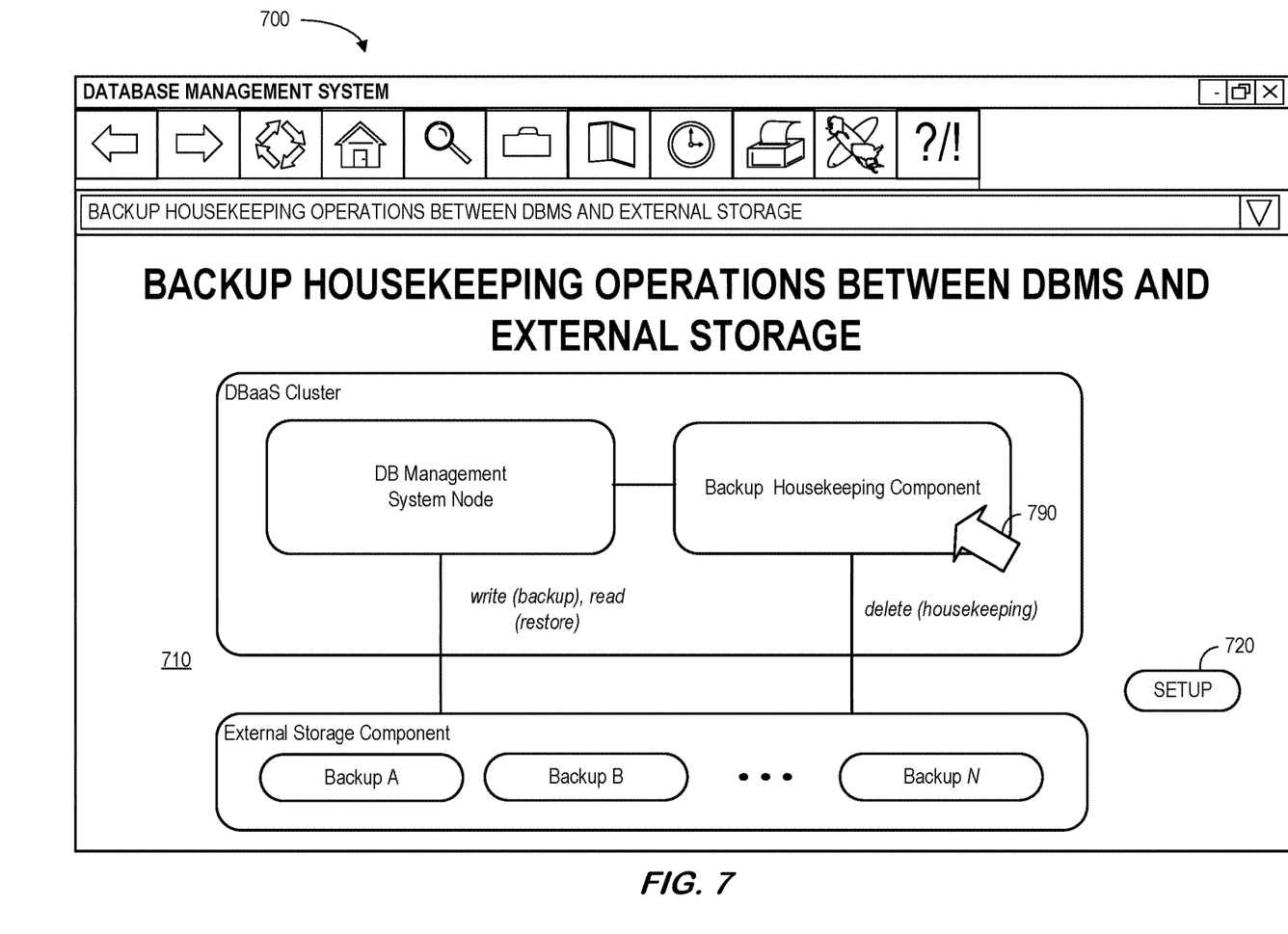
FIG. 7 is a real-time database backup housekeeping display in accordance with some embodiments.

FIG. 7 is a real-time database backup housekeeping display in accordance with some embodiments. The display 700 includes graphical elements 710 of a backup housekeeping system including DBaaS cluster and an external storage component. Selection of a graphical element (e.g., via a touchscreen or computer mouse pointer 790) may let an operator or administrator view additional information about that element (e.g., via a popup window) and/or adjust parameters associated with that element (e.g., backup mappings, customer requirements, system status, etc.). Moreover, selection of a "Setup" icon 720 may let a user configure operation of the system.

Figure 8:
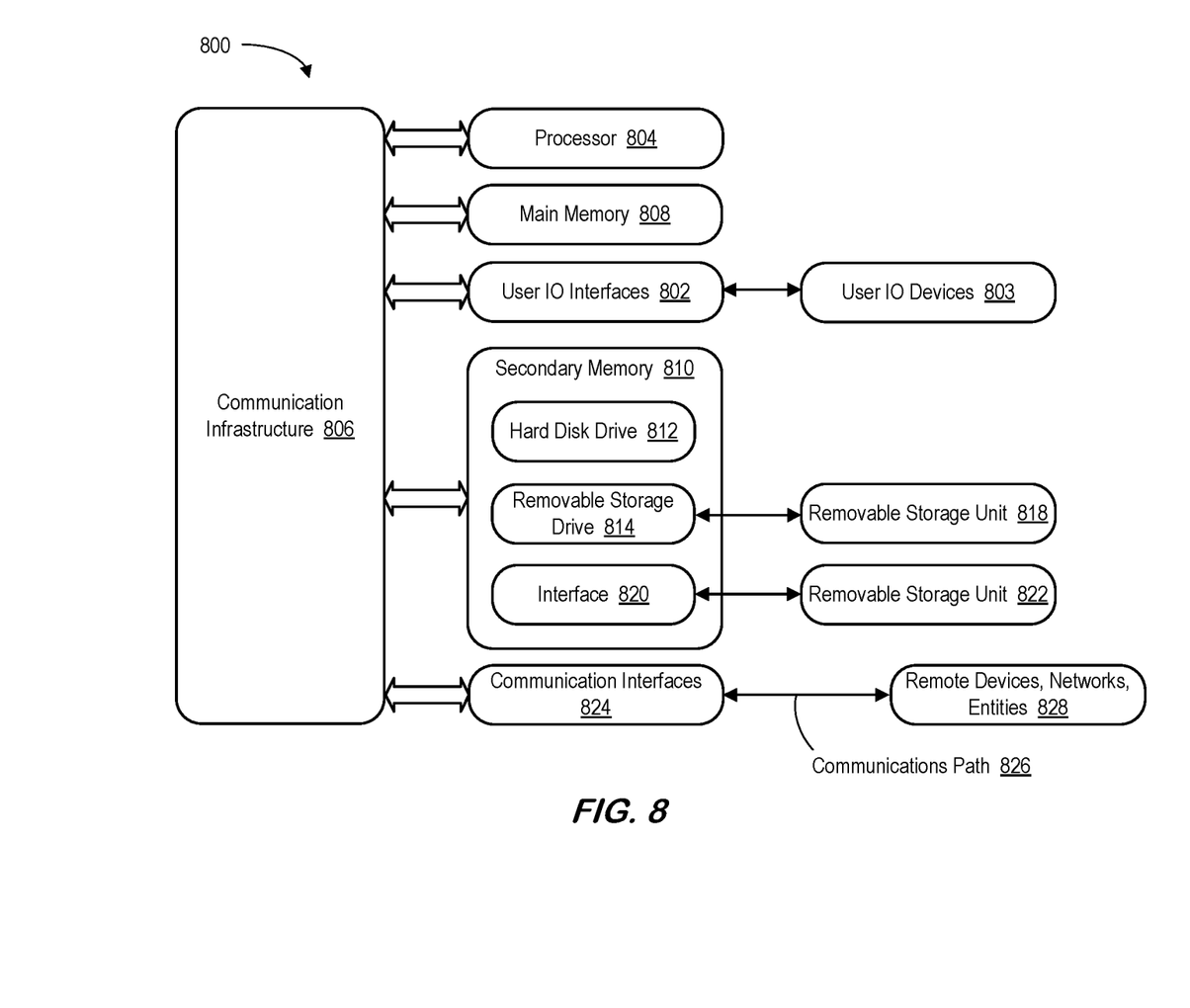
FIG. 8 is an example of a computer system useful for implementing various embodiments.

Various embodiments can be implemented, for example, using one or more well-known computer systems, such as computer system 800 shown in FIG. 8. The computer system 800 can be any well-known computer capable of performing the functions described herein. Computer system 800 includes one or more processors (also called CPUs), such as a processor 804. Processor 804 is connected to a communication infrastructure or bus 806.

One or more processors 804 may each be a Graphics Processing Unit ("GPU"). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure xx06 through user input/output interface(s) 802.

Computer system 800 also includes a main or primary memory 808, such as Random-Access Memory ("RAM"). Main memory 808 may include one or more levels of cache.

Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

Figure 9:
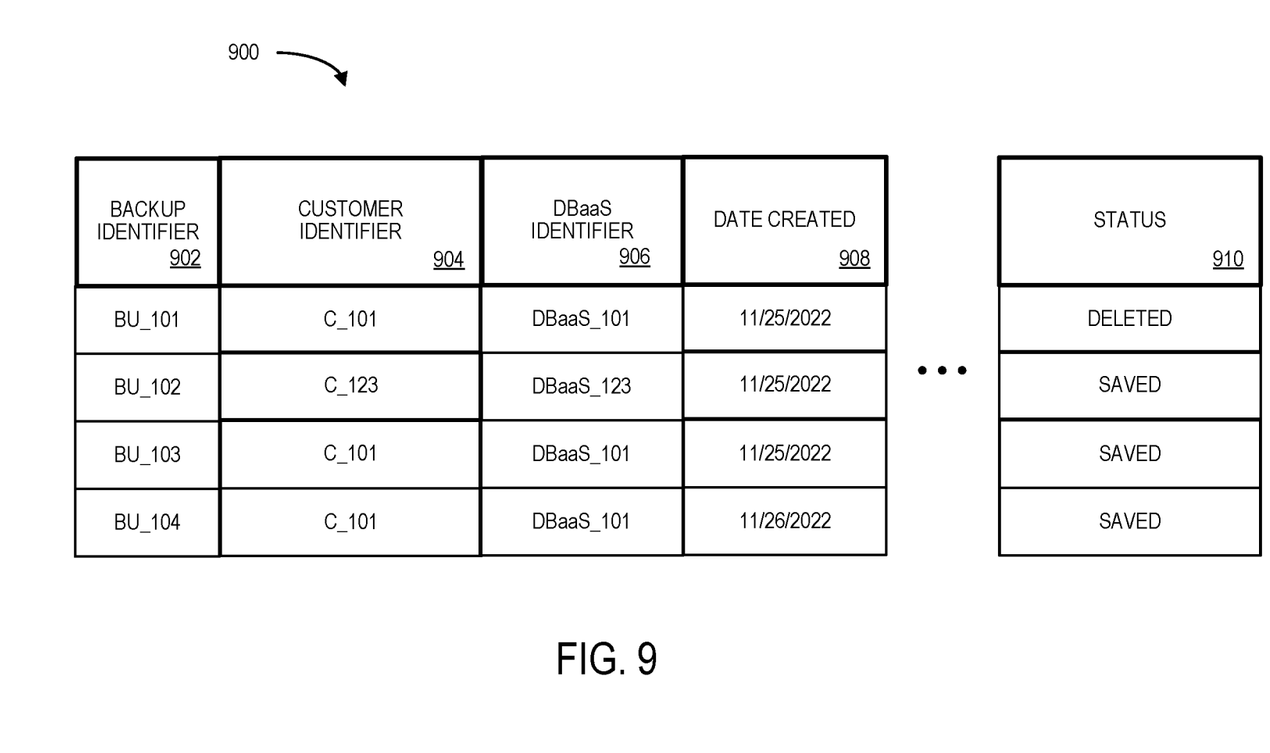
FIG. 9 is a portion of a tabular backup object database in accordance with some embodiments.

Referring to FIG. 9, a table is shown that represents a backup object database 900 in accordance with some embodiments. The table may include, for example, entries associated with database backups stored in external storage. The table may also define fields 902, 904, 906, 908, 910 for each of the entries. The fields 902, 904, 906, 908, 910 may, according to some embodiments, specify: a backup identifier 902, a customer 904, a DBaaaS identifier 906, date created 908, and a status 910. The backup object database 900 may be created and updated, for example, based on information electrically received from various operators, administrators, and computer systems (e.g., including those of housekeeping job).

The backup identifier 902 may be, for example, a unique alphanumeric code identifying a single backup object stored in external storage. The customer identifier 904 may indicate a customer associated with the backup and the DBaaS identifier 906 may be associated with a cluster executing the database. The date created 908 might indicate when the backup object was created (and may be used to make housekeeping decisions depending on requirements). The status 910 might indicate that the backup object is deleted, saved, pending deletion, etc.

Figure 10:
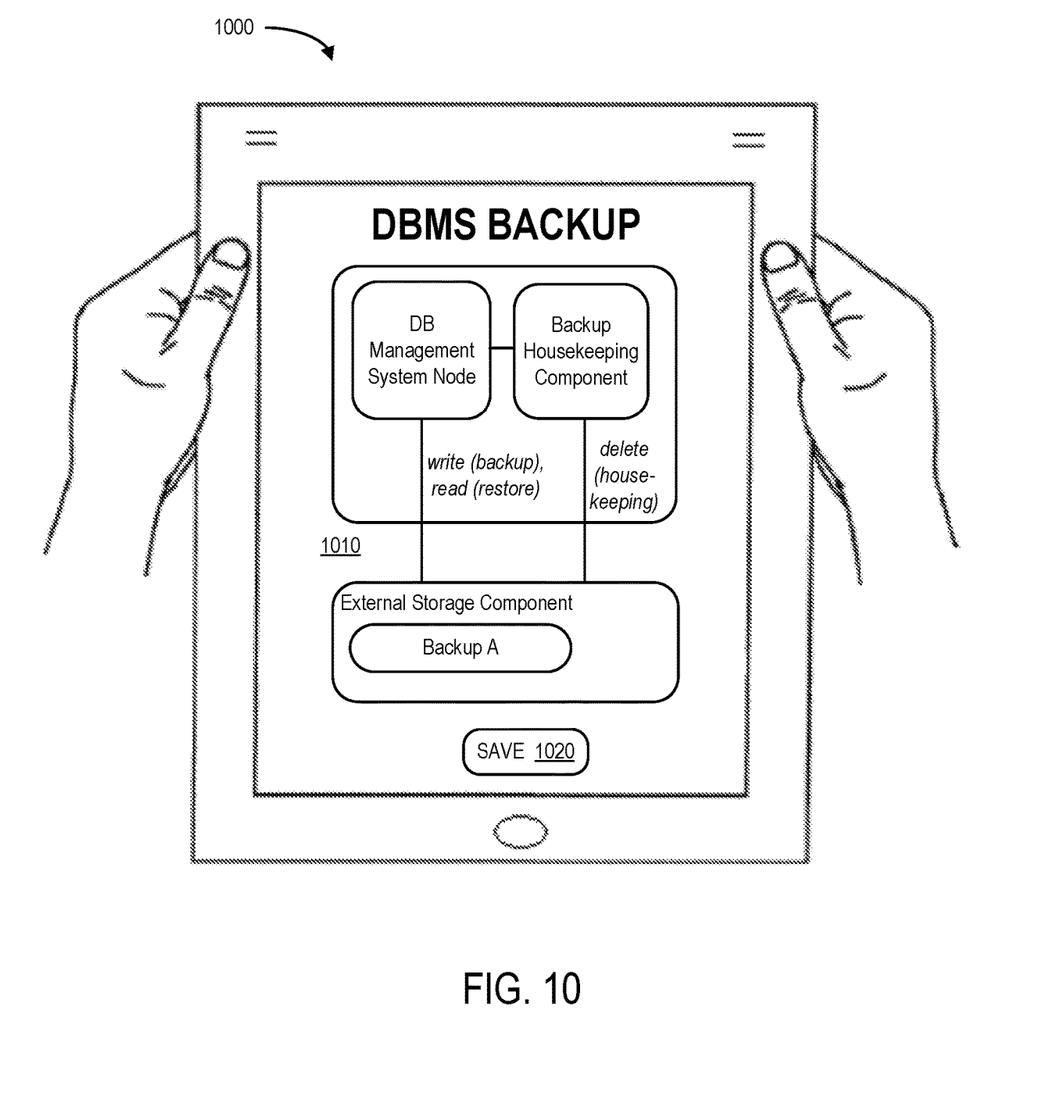
FIG. 10 illustrates a handheld tablet computer with a database backup housekeeping display according to some embodiments.

The displays and devices illustrated herein are only provided as examples, and embodiments may be associated with any other types of user interfaces. For example, FIG. 10 illustrates a handheld tablet computer with a database backup housekeeping display 1010 according to some embodiments. The database backup housekeeping display 1010 might include user-selectable data that can be highlighted and/or modified by a user of the handheld computer 1000 to provide information about backup objects, requirements, etc. Moreover, selection of a "Save" icon 1020 may store the values to be used by any of the embodiments described herein.

Thus, embodiments may manage database management system backup objects in a secure, automatic, and accurate manner. Moreover, a single component may handle the responsibility for the deletion of backups. If an attacker is able to execute arbitrary code on the RDBMS (host), he or she might still be able to create new backups just as with a traditional RDBMS (and possibly causes other harm to the system). However, no deletion of backup data will be possible. In addition, embodiments may provide for the easy update of housekeeping strategies by updating only a single component (instead of updating all installed RDBMS throughout the systems as is normally required).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases and storage elements described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented.

The present invention has been described in terms of several embodiments solely for the purpose of illustration.

Persons skilled in the art will recognize from this description that the invention is not limited to the embodiments described, but may be practiced with modifications and alterations limited only by the spirit and scope of the appended claims.

The invention claimed is:

1. A system to manage database management system backup objects, comprising:
an external storage component storing at least a first database management system backup object;
a database management system node in a database management system, the database management system node being configured to write information to and read information from the external storage component; and
a backup housekeeping component in the database management system, the backup housekeeping component being independent of the database management system node and configured to delete information in the external storage component, including:
a computer processor; and
a computer memory, coupled to the computer processor, storing instructions that, when executed by the computer processor, cause the system to:
write information to and read information from the external storage component by the database management system node, wherein the database management system node is disallowed from deleting information in the external storage component;
trigger, by the backup housekeeping component, a request to retrieve backup requirement information from the database management system node, wherein the backup housekeeping component is disallowed to write information to and read information from the external storage component; and
delete, by the backup housekeeping component, all database management system backup objects in the external storage component that are no longer required based on the retrieved backup requirement information from the database management system node, including the first database management object, based on the retrieved backup requirement information including an indication of the backup objects in the external storage component to delete.

2. The system of claim 1, wherein the backup housekeeping component is part of a storage system associated with the external storage component.

3. The system of claim 1, wherein the external storage component stores a plurality of database management system backup objects for a customer.

4. The system of claim 3, wherein the external storage component stores a plurality of database management system backup objects for a plurality of customers.

5. The system of claim 1, wherein the backup requirement information is associated with at least one of: (i) a maximum backup age, (ii) a latest backup identifier, and (iii) an indication of a newest backup to be deleted.

6. The system of claim 1, wherein the backup housekeeping component is further to transmit, to the database management system node, a confirmation that the first database management system backup object has been deleted.

7. The system of claim 6, wherein the database management system node updates a database backup catalog in response to the confirmation received from the backup housekeeping component.

8. The system of claim 1, wherein the database management system node is associated with a database as a service cluster of a hyper-scaler infrastructure.

9. The system of claim 1, wherein a backup housekeeping strategy of the backup housekeeping component is updated.

10. A computer-implemented method to manage database management system backup objects, comprising:
writing information to and reading information from an external storage component storing at least a first database management system backup object by a processor of a database management system node in a database management system, wherein the database management system node is disallowed from deleting information in the external storage component;
triggering, by a computer processor of a backup housekeeping component in the database management system that is independent of the database management system node and configured to delete information in the external storage component and disallowed to write information to and read information from the external storage component, a request to retrieve backup requirement information from the database management system node; and
deleting, by the computer processor of the backup housekeeping component, all database management system backup objects in the external storage component that are no longer required based on the retrieved backup requirement information from the database management system node, including the first database management object, based on the retrieved backup requirement information including an indication of the backup objects in the external storage component to delete.

11. The method of claim 10, wherein the backup housekeeping component is part of a storage system associated with the external storage component.

12. The method of claim 10, wherein the external storage component stores a plurality of database management system backup objects for a customer.

13. The method of claim 12, wherein the external storage component stores a plurality of database management system backup objects for a plurality of customers.

14. A non-transitory, computer-readable medium storing instructions to be executed by a processor to perform a method to manage database management system backup objects, the method comprising:
writing information to and reading information from an external storage component storing at least a first database management system backup object by a processor of a database management system node in a database management system, wherein the database management system node is disallowed from deleting information in the external storage component;
triggering, by a computer processor of a backup housekeeping component in the database management system that is independent of the database management system node and configured to delete information in the external storage component and disallowed to write information to and read information from the external storage component, a request to retrieve backup requirement information from the database management system node; and
deleting, by the computer processor of the backup housekeeping component, all database management system backup objects in the external storage component that are no longer required based on the retrieved backup requirement information from the database management system node, including the first database management object, based on the retrieved backup requirement information including an indication of the backup objects in the external storage component to delete.

15. The medium of claim 14, wherein the backup requirement information is associated with at least one of: (i) a maximum backup age, (ii) a latest backup identifier, and (iii) an indication of a newest backup to be deleted.

16. The medium of claim 14, wherein the backup housekeeping component is further to transmit, to the database management system node, a confirmation that the first database management system backup object has been deleted.

17. The medium of claim 16, wherein the database management system node updates a database backup catalog in response to the confirmation received from the backup housekeeping component.

18. The medium of claim 14, wherein the database management system node is associated with a database as a service cluster of a hyper-scaler infrastructure.

19. The medium of claim 14, wherein a backup housekeeping strategy of the backup housekeeping component is updated.

\* \* \* \* \*